(12) United States Patent
Generale et al.

(10) Patent No.: US 11,078,844 B2
(45) Date of Patent: Aug. 3, 2021

(54) THERMAL GRADIENT REDUCING DEVICE FOR GAS TURBINE ENGINE COMPONENT

(71) Applicant: United Technologies Corporation, Farmington, CT (US)

(72) Inventors: Adam P. Generale, Dobbs Ferry, NY (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/197,835

(22) Filed: Nov. 21, 2018

(65) Prior Publication Data

US 2020/0158018 A1    May 21, 2020

(51) Int. Cl.
*F02C 7/18* (2006.01)
*F01D 25/00* (2006.01)

(52) U.S. Cl.
CPC .............. *F02C 7/18* (2013.01); *F01D 25/005* (2013.01); *F05D 2240/12* (2013.01); *F05D 2260/203* (2013.01)

(58) Field of Classification Search
CPC .......... F02C 7/18; F01D 25/005; F01D 1/187; F01D 1/188; F01D 1/189; F05D 2240/12; F05D 2260/203; F05D 2260/20; F05D 2260/231
See application file for complete search history.

(56) References Cited

U.S. PATENT DOCUMENTS

| | | | |
|---|---|---|---|
| 3,930,748 A * | 1/1976 | Redman | F01D 5/189 416/97 R |
| 4,461,612 A | 7/1984 | Dodd | |
| 10,533,427 B2 * | 1/2020 | Marsh | F01D 5/189 |
| 2003/0031555 A1 | 2/2003 | Noe et al. | |
| 2009/0185903 A1 | 7/2009 | Beeck et al. | |
| 2014/0093379 A1 * | 4/2014 | Tibbott | F01D 5/189 416/224 |
| 2017/0030303 A1 * | 2/2017 | Takakura | F02M 25/089 |
| 2018/0163555 A1 | 6/2018 | Snider et al. | |
| 2019/0153879 A1 * | 5/2019 | Vetters | F01D 5/18 |
| 2019/0170014 A1 * | 6/2019 | Spangler | F01D 5/147 |

FOREIGN PATENT DOCUMENTS

| | | |
|---|---|---|
| EP | 1452689 A1 | 9/2004 |
| EP | 2098688 A1 | 9/2009 |
| GB | 2107405 A | 4/1983 |

OTHER PUBLICATIONS

European Search Report for European Application No. 19210480.0 dated Apr. 9, 2020, 8 pages.

* cited by examiner

*Primary Examiner* — Justin D Seabe
*Assistant Examiner* — Ryan C Clark
(74) *Attorney, Agent, or Firm* — Cantor Colburn LLP (57) ABSTRACT

An internally cooled component for a gas turbine engine includes a component having one or more exterior walls defining an internal component cavity configured for a cooling airflow to flow therethrough. An internal component rib extends into the internal component cavity from the one or more exterior walls. An insert is positioned in the internal component cavity, and a flow discourager is positioned at the insert and is configured to prevent the cooling airflow from flowing past the internal component rib.

18 Claims, 6 Drawing Sheets

THERMAL GRADIENT REDUCING DEVICE FOR GAS TURBINE ENGINE COMPONENT

BACKGROUND

Exemplary embodiments of the present disclosure pertain to the art of gas turbine engines, and more particularly to internally-cooled components of gas turbine engines.

Components of gas turbine engines, for example, turbine vanes or the like, are subjected to high temperatures during operation of the gas turbine engine, which limits the service life of the components. Through combinations of material selection and internal cooling of the components via a cooling airflow the service life may be extended. In order to meet cooling air requirements for components in the turbine, a solution of interest in the industry is switching from single crystal Ni-based superalloys to high temperature materials capable of exposure to absolute temperatures hundreds of degrees in excess of current capabilities. Often these higher temperature materials, however, have significantly reduced allowable stresses during operation. For components such as turbine vanes, the thermo-mechanical stresses experienced are often heavily weighted towards thermally induced stresses arising from thermal gradients within the part, for example, between an outer component surface exposed to the hot gas path or the gas turbine engine and an inner component surface exposed to the cooling airflow inside of the component.

BRIEF DESCRIPTION

In one embodiment, an internally cooled component for a gas turbine engine includes a component having one or more exterior walls defining an internal component cavity configured for a cooling airflow to flow therethrough. An internal component rib extends into the internal component cavity from the one or more exterior walls. An insert is positioned in the internal component cavity, and a flow discourager is positioned at the insert and is configured to prevent the cooling airflow from flowing past the internal component rib.

Additionally or alternatively, in this or other embodiments the flow discourager is retained in an insert pocket of the insert.

Additionally or alternatively, in this or other embodiments the insert pocket includes one or more tabs to retain the flow discourager at the insert pocket.

Additionally or alternatively, in this or other embodiments the flow discourager is formed integral to the insert.

Additionally or alternatively, in this or other embodiments the flow discourager is one of a rope seal or a fabric seal.

Additionally or alternatively, in this or other embodiments the insert urges the flow discourager into contact with one or more of the one or more exterior walls or the internal component rib.

Additionally or alternatively, in this or other embodiments the flow discourager extends along the insert from a first exterior wall of the one or more exterior walls, along the internal component rib and to a second exterior wall of the one or more exterior walls.

Additionally or alternatively, in this or other embodiments the insert is hollow.

In another embodiment, a turbine vane assembly includes a stator vane having a pressure side extending from the leading edge to the trailing edge and a suction side extending from the leading edge to the trailing edge. The pressure side and the suction side together define an internal vane cavity therebetween. The internal vane cavity is configured for a cooling airflow to flow therethrough. An internal vane rib extends into the internal vane cavity from one or more of the pressure side or the suction side. A vane insert is positioned in the internal vane cavity, and a flow discourager is positioned at the vane insert and is configured to prevent the cooling airflow from flowing past the internal vane rib.

Additionally or alternatively, in this or other embodiments the flow discourager is retained in an insert pocket of the vane insert.

Additionally or alternatively, in this or other embodiments the insert pocket includes one or more tabs to retain the flow discourager at the insert pocket.

Additionally or alternatively, in this or other embodiments the vane insert urges the flow discourager into contact with one or more of the pressure side the suction side or the internal vane rib.

Additionally or alternatively, in this or other embodiments the flow discourager extends along the insert from the pressure side, along the internal vane rib and to the suction side.

Additionally or alternatively, in this or other embodiments the insert is hollow.

Additionally or alternatively, in this or other embodiments the flow discourager is one of a rope seal or a fabric seal.

Additionally or alternatively, in this or other embodiments the flow discourager is formed from a metallic material or a ceramic material.

Additionally or alternatively, in this or other embodiments the flow discourager is formed integral to the insert.

Additionally or alternatively, in this or other embodiments a cover plate is positioned at the turbine vane to redirect the cooling airflow through the turbine vane.

In yet another embodiment, a gas turbine engine includes a combustor and one or more internally cooled components in flow communication with the combustor. The one or more internally cooled components includes a component having one or more exterior walls defining an internal component cavity configured for a cooling airflow to flow therethrough, and an internal component rib extending into the internal component cavity from the one or more exterior walls. An insert is positioned in the internal component cavity, and a flow discourager is positioned at the insert configured to prevent the cooling airflow from flowing past the internal component rib.

Additionally or alternatively, in this or other embodiments the flow discourager is retained in an insert pocket of the insert and the insert pocket includes one or more tabs to retain the flow discourager at the insert pocket.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
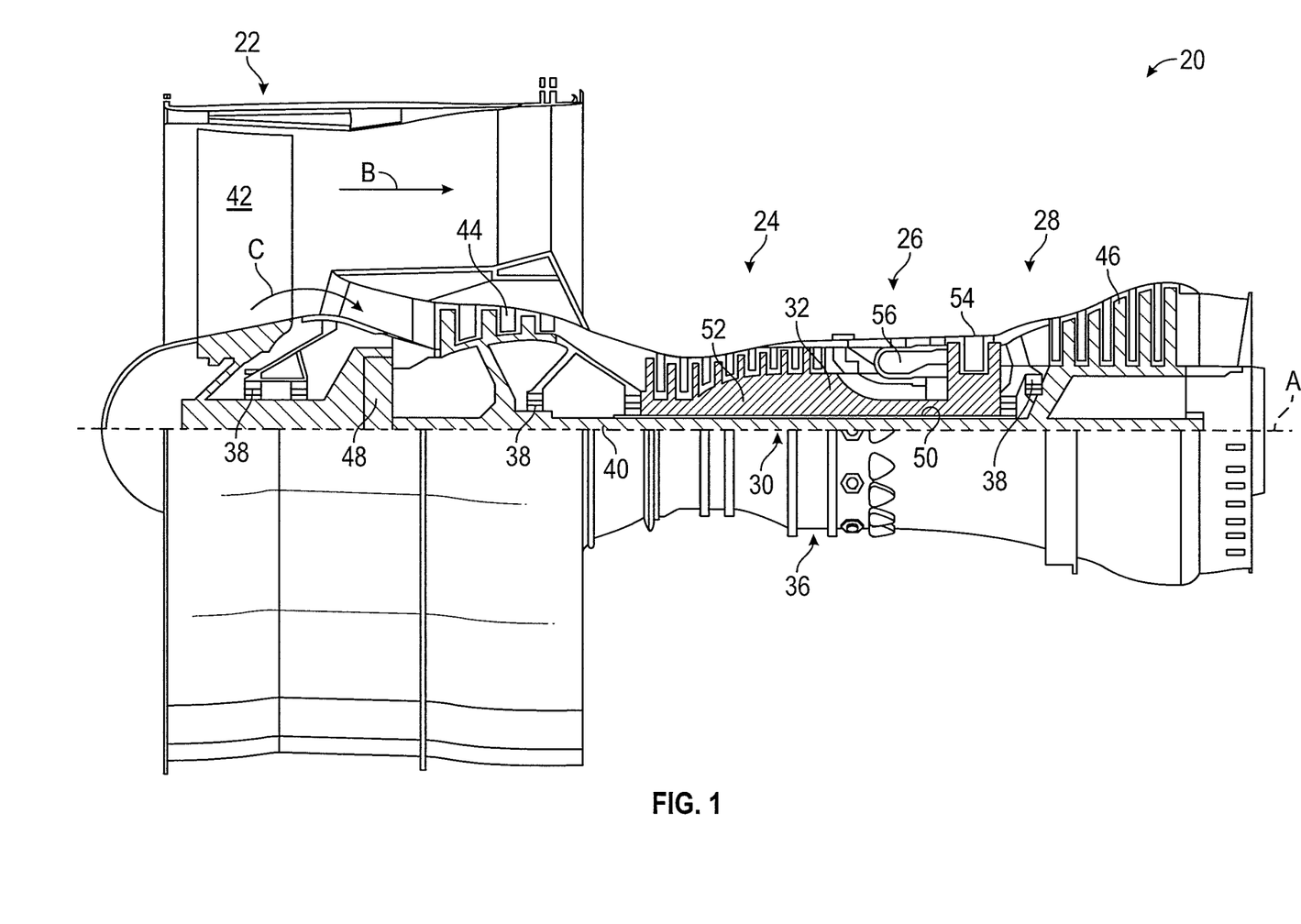
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
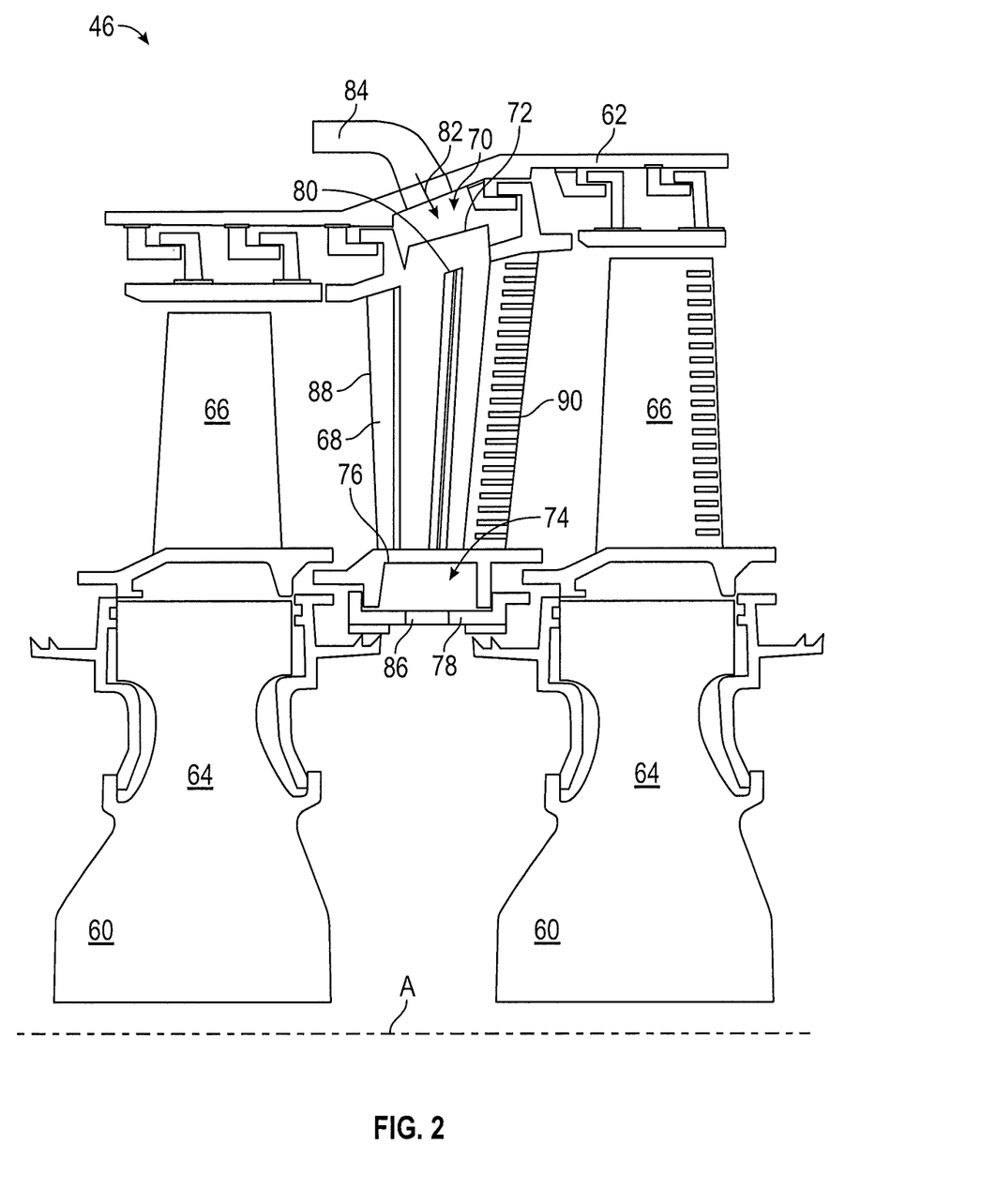
FIG. 2 is a partial cross-sectional view of a turbine section of a gas turbine engine.

Referring now to FIG. 2, the low pressure turbine 46 includes one or more turbine rotors 60 positioned in a turbine case 62 and rotatable about the engine central longitudinal axis A. While the following description is in the context of a low pressure turbine 46, one skilled in the art will readily appreciate that the present disclosure may be readily applied to the high pressure turbine 54. Each of the turbine rotors 60 includes a rotor disc 64 with a plurality of rotor blades 66 extending radially outwardly from the rotor disc 64 toward the turbine case 62. One or more rows of stator vanes 68 are located, for example, between adjacent turbine rotors 60, and/or upstream or downstream of the turbine rotors 60. The stator vanes 68 may be retained at the turbine case 62. The stator vanes 68 include a vane outer cavity 70 located at a vane outer diameter 72 between the stator vane 68 and the turbine case 62. Further a vane inner cavity 74 is located at a vane inner diameter 76 between the stator vane 68 and an inner air seal 78. The vane outer cavity 70 is connected to a cooling airflow inlet 80 to direct a cooling airflow 82 into the stator vane 68 from, for example, a turbine cooling air (TCA) pipe 84. The cooling airflow 82 flows through one or more cooling passages in the stator vane 68 and into the vane inner cavity 74, then exits the vane inner cavity 74 at an outlet orifice 86 in, for example, the inner air seal 78.

It is to be appreciated that while the following description relates to a stator vane 68, one skilled in the art will readily appreciate that the present disclosure may be utilized in other internally cooled components of a gas turbine engine, such as a blade outer air seal or the like. Referring now to the cross-sectional view of stator vane 68 in FIG. 3, the stator vane 68 includes a vane leading edge 88 and a vane trailing edge 90, relative to the direction of core airflow along the core flowpath C. The vane includes a vane pressure side 92 and a vane suction side 94 each extending from the vane leading edge 88 to the vane trailing edge 90. One or more internal vane ribs 96 extend between the vane suction side 94 and the vane pressure side 92 defining one or more vane cavities 98 directing the cooling airflow 82 through the stator vane 68 and for structural support of the stator vane 68.

Figure 3:
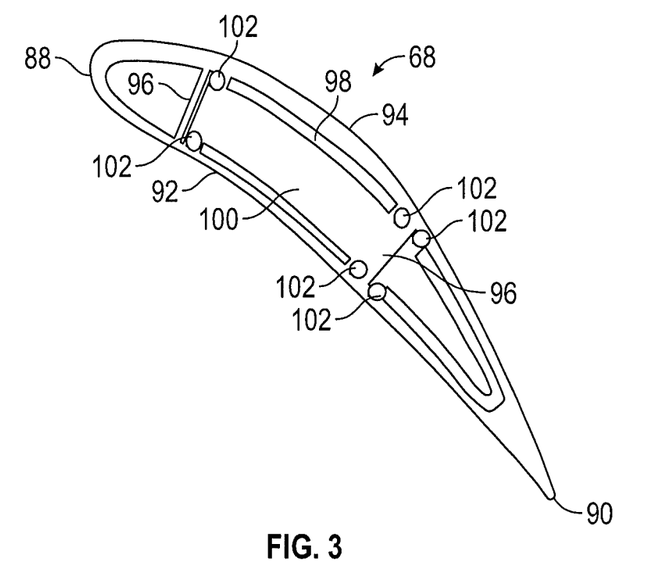
FIG. 3 is a cross-sectional view of an embodiment of a turbine vane.

Typically, due to their direct exposure to the core airflow, the vane suction side 94 and the vane pressure side 92 are exposed to much higher temperatures than the internal vane ribs 96, which typically are exposed directly to the cooling airflow 82. Thus, in a typical vane configuration, there is a high thermal gradient between the internal vane ribs 96 and the vane pressure side 92 and vane suction side 94, which reduces the service life of the stator vane 68.

To combat the thermal gradient, the stator vane 68 includes a vane insert 100 located in one or more of the vane cavities 98 and a flow discourager 102 disposed between the vane insert 100 and the internal vane rib 96. The vane insert 100 urges the flow discourager 102 into contact with the internal vane rib 96 and/or the vane pressure side 92 or the vane suction side 94 to prevent the cooling airflow 82 from flowing past the internal vane rib 96. The lack of cooling airflow 82 past the internal vane rib 82 increases a temperature of the internal vane rib 96 and reduces the thermal gradient across the internal vane rib 96. In the embodiment of FIG. 3, the vane inset 100 is positioned between two internal vane ribs 96 and four flow discouragers 102 are installed to the vane inset 100, with two flow discouragers 102 positioned at each internal vane rib 96 to prevent cooling airflow 82 from flowing across the internal vane rib 96. It is to be appreciated that other quantities and locations of vane inserts 100 and flow discouragers 102 may be utilized.

Figure 4:
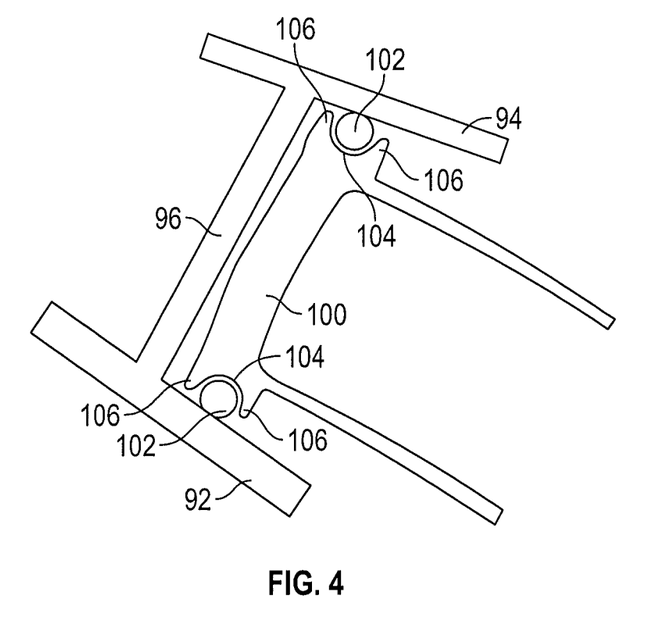
FIG. 4 is a partial cross-sectional view of a retainer for a flow discourager of a turbine vane.
Figure 4A:
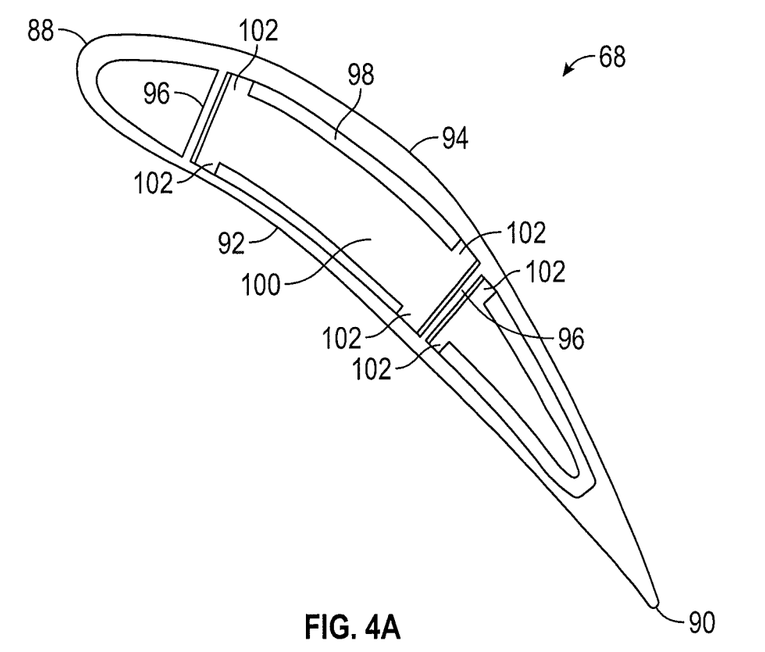
FIG. 4A is another cross-sectional view of an embodiment of a turbine vane.
Figure 5:
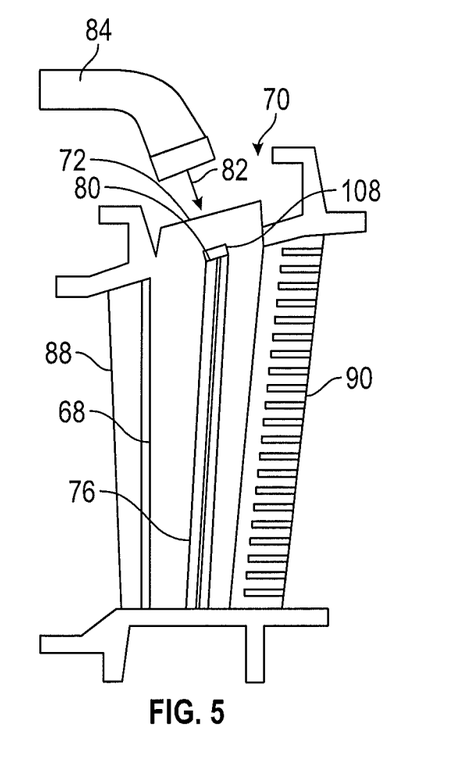
FIG. 5 is another cross-sectional view of an embodiment of a turbine vane.

The vane insert 100 is formed by, for example, casting, additive manufacturing, or stamping, while the flow discourager 102 is, in some embodiments a seal such as a rope seal or fabric seal, and may be formed from, for example, a metallic or ceramic material. Referring now to FIG. 4, in some embodiments, the vane insert 100 includes an insert pocket 104 into which the flow discourager 102 is installed. The vane insert 100 may also include one or more tabs 106 at the insert pocket 104 to locate and retain the flow discourager 102 at the insert pocket 104. In another embodiment, illustrated in FIG. 4A, the flow discourager is not a separate component installed to the vane insert 100, but is formed integral to the vane insert 100. Referring to FIG. 5, a cap 108 may be installed at the cooling airflow inlet 80 over the vane insert 100 to prevent cooling airflow 82 from flowing between the vane insert 100 and the internal vane rib 96 from a radially outwardly direction.

Figure 6:
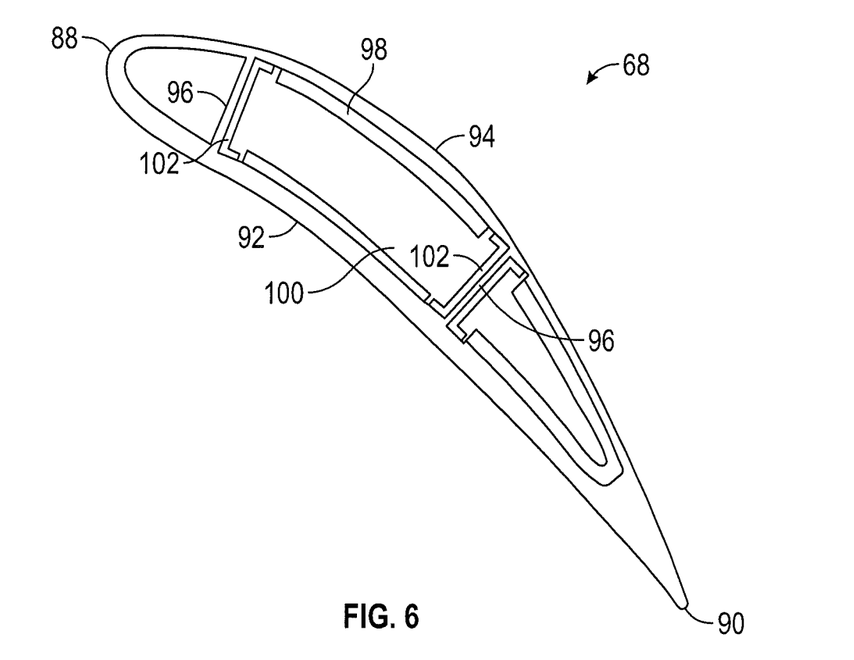
FIG. 6 is a cross-sectional view of another embodiment of a turbine vane.

Another embodiment of flow discourager 102 arrangement is shown in FIG. 6. In this embodiment, the flow discourager 102 extends around the vane insert 100 from between the vane insert 100 and the vane pressure side 92 to between the vane insert 100 and the vane suction side 94, through the space between the vane insert 100 and the vane internal rib 96. In such an embodiment, it may not necessary to utilize the cap 108, but in some embodiments the cap 108 may be included.

Figure 7:
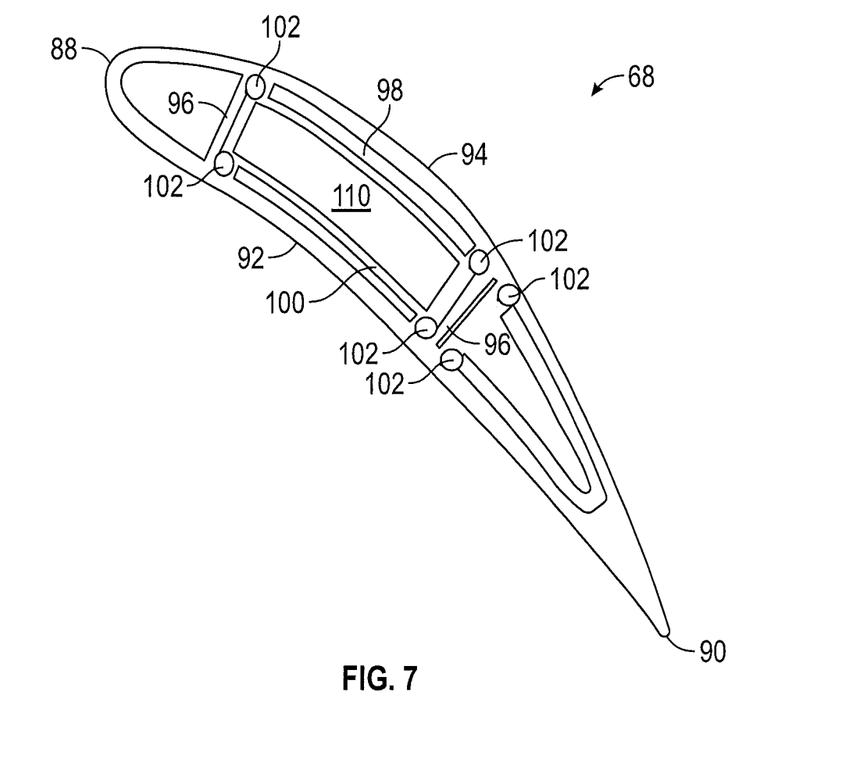
FIG. 7 is a cross-sectional view of yet another embodiment of a turbine vane.
Figure 8:
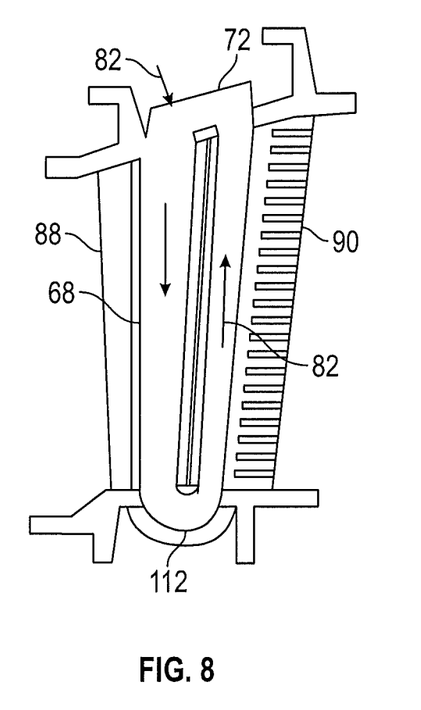
FIG. 8 is another cross-sectional view of an embodiment of a turbine vane.

Referring to FIG. 7, in some embodiments the vane insert 100 is hollow and includes an insert cavity 110. Cooling airflow 82 may be directed through the insert cavity. In the embodiment illustrated in FIG. 8, the stator vane 68 is configured as a multipass stator vane 68 in which the cooling airflow 82 enters the stator vane 68 at the vane outer diameter 72 and also exits the stator vane 68 at the vane outer diameter 72. In such embodiments, the stator vane 68 includes a cover plate 112 at the vane inner diameter 74 to turn the cooling airflow 82 and redirect the cooling airflow 82 toward the vane outer diameter 72.

The vane insert 100 and flow discourager 102 arrangements described herein reduces thermal gradients in the stator vane 68, which allows for the use of high temperature materials such as ceramic matrix composite (CMC) materials in forming of the stator vane 68.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An internally cooled component for a gas turbine engine, comprising:
   a component having two or more exterior walls defining an internal component cavity configured for a cooling airflow to flow therethrough;
   an internal component rib extending into the internal component cavity from the two or more exterior walls;
   an insert positioned in the internal component cavity, the cooling airflow directed to flow between the insert and the two or more exterior walls; and
   two or more flow discouragers positioned at the insert configured to prevent the cooling airflow from flowing out of the component cavity between the insert and the two or more exterior walls, and past the internal component rib,
   wherein a flow discourager of the two or more flow discouragers is retained between an exterior wall of the two or more exterior walls and the insert such that the flow discourager is maintained in contact with the exterior wall and does not contact the internal component rib.

2. The internally cooled component of claim 1, wherein a flow discourager of the two or more flow discouragers is retained in an insert pocket of the insert.

3. The internally cooled component of claim 2, wherein the insert pocket includes one or more tabs to retain the flow discourager of the two or more flow discouragers at the insert pocket.

4. The internally cooled component of claim 1, wherein a flow discourager of the two or more flow discouragers is formed integral to the insert.

5. The internally cooled component of claim 1, wherein a flow discourager of the two or more flow discouragers is one of a rope seal or a fabric seal.

6. The internally cooled component of claim 1, wherein the insert urges the flow discourager of the two or more flow discouragers into contact with the exterior wall.

7. The internally cooled component of claim 1, wherein the insert is hollow.

8. A turbine vane assembly, comprising:
  a stator vane, including:
    a pressure side extending from the leading edge to the trailing edge; and
    a suction side extending from the leading edge to the trailing edge, the pressure side and the suction side together defining an internal vane cavity therebetween, the internal vane cavity configured for a cooling airflow to flow therethrough;
  an internal vane rib extending into the internal vane cavity from one or more of the pressure side or the suction side;
  an insert positioned in the internal component cavity, the cooling airflow directed to flow between the insert and the one or more exterior walls; and
  two or more flow discouragers positioned at the insert configured to prevent the cooling airflow from flowing out of the component cavity between the insert and the one or more of the pressure side or the suction side, and past the internal component rib,
  wherein a flow discourager of the two or more flow discouragers is retained between one of the pressure side or the suction side and the insert such that the flow discourager is maintained in contact with the one of the pressure side or the suction side and does not contact the internal component rib.

9. The turbine vane assembly of claim 8, wherein a flow discourager of the two or more flow discouragers is retained in an insert pocket of the insert.

10. The turbine vane assembly of claim 9, wherein the insert pocket includes one or more tabs to retain the flow discourager of the two or more flow discouragers at the insert pocket.

11. The turbine vane assembly of claim 8, wherein the vane insert urges the flow discourager of the two or more flow discouragers into contact with the one of the pressure side or the suction side.

12. The turbine vane assembly of claim 8, wherein the insert is hollow.

13. The turbine vane assembly of claim 8, wherein a flow discourager of the two or more flow discouragers is one of a rope seal or a fabric seal.

14. The turbine vane assembly of claim 8, wherein a flow discourager of the two or more flow discouragers is formed from a metallic material or a ceramic material.

15. The turbine vane assembly of claim 8, wherein the a flow discourager of the two or more flow discouragers is formed integral to the insert.

16. The turbine vane assembly of claim 8, further comprising a cover plate disposed at the turbine vane to redirect the cooling airflow through the turbine vane.

17. A gas turbine engine, comprising:
  a combustor; and
  one or more internally cooled components in flow communication with the combustor including:
    a component having two or more exterior walls defining an internal component cavity configured for a cooling airflow to flow therethrough;
    an internal component rib extending into the internal component cavity from the two or more exterior walls;
    an insert positioned in the internal component cavity, the cooling airflow directed to flow between the insert and the one two or more exterior walls; and
    two or more flow discouragers positioned at the insert configured to prevent the cooling airflow from flowing out of the component cavity between the insert and the two or more exterior walls, and past the internal component rib,
    wherein a flow discourager of the two or more flow discouragers is retained between an exterior wall of the two or more exterior walls and the insert such that the flow discourager is maintained in contact with the exterior wall and does not contact the internal component rib.

18. The gas turbine engine of claim 17, wherein a flow discourager of the two or more flow discouragers is retained in an insert pocket of the insert and the insert pocket includes one or more tabs to retain a flow discourager of the two or more flow discouragers at the insert pocket.

* * * * *